(12) United States Patent
Kerschbaum

(10) Patent No.: US 8,131,999 B2
(45) Date of Patent: Mar. 6, 2012

(54) DISTANCE-PRESERVING ANONYMIZATION OF DATA

(75) Inventor: Florian Kerschbaum, Karlsruhe (DE)

(73) Assignee: SAP AG, Walldorf (DE)

( * ) Notice: Subject to any disclaimer, the term of this patent is extended or adjusted under 35 U.S.C. 154(b) by 1074 days.

(21) Appl. No.: 12/021,194

(22) Filed: Jan. 28, 2008

(65) Prior Publication Data

US 2008/0215842 A1 Sep. 4, 2008

(30) Foreign Application Priority Data

Feb. 15, 2007 (EP) .................................... 07003201

(51) Int. Cl.
*H04L 9/00* (2006.01)
*H04L 29/06* (2006.01)

(52) U.S. Cl. ........................... 713/162; 380/277; 726/26

(58) Field of Classification Search .................. None
See application file for complete search history.

(56) References Cited

U.S. PATENT DOCUMENTS

| | | | |
|---|---|---|---|
| 7,860,245 B2 * | 12/2010 | Kerschbaum et al. .......... | 380/33 |
| 2003/0067537 A1 * | 4/2003 | Myers .............................. | 348/47 |
| 2007/0016528 A1 | 1/2007 | Verhaegh et al. | |

OTHER PUBLICATIONS

"European Application Serial No. 09007834.6, Extended European Search Report mailed Aug. 27, 2009", 8 pgs.

Atallah, Mikhall J., et al., "Secure and Private Sequence Comparisons", *Proceedings of the 2003 ACM Workshop on Privacy in the Electronic Society*, [Online]. Retrieved from the Internet: <URL: http://citeseerx.ist.psu.edu/viewdoc/summary?doi=10.1.1.10.6669>, (2003), 39-44.

Gedrojc, Bartek, et al., "Private Matching of Noisy Data", *27th Symposium on Information Theory in the Benelux*, (Jun. 8, 2006), 275-282.

Vielhauer, Claus, et al., "Security for Biometric Data", *Security, Steganography and Watermarking of Multimedia Contents VI*, (2004), 642-652.

* cited by examiner

*Primary Examiner* — Kaveh Abrishamkar

(74) *Attorney, Agent, or Firm* — Schwegman, Lundberg & Woessner, P.A.

(57) ABSTRACT

An embodiment includes a system with a processing unit and a communication unit. The processing unit is configured: to compute a first reference point of a data point that represents a private data item and has a first distance value to the data point, wherein the first distance value is less than a threshold value, to compute a second reference point of the data point different from the first reference point with a second distance value to the data point, wherein the second distance value is less than the threshold value, and to generate hidden reference points from the reference points. The communication unit is configured to send the hidden reference points and distance values to a system.

18 Claims, 6 Drawing Sheets

DISTANCE-PRESERVING ANONYMIZATION OF DATA

CLAIM OF PRIORITY

The present patent application claims the priority benefit of the filing date of European Application (EPO) No. 07003201.6 filed Feb. 15, 2007, entitled, "Distance-Preserving-Anonymization of Data," the entire content of which is incorporated herein by reference.

TECHNICAL FIELD

Embodiments relate generally to the field of electronic data processing and more specifically to security of computer systems and electronic data.

BACKGROUND AND PRIOR ART

The field of electronic data processing has reached a high level of development in the last years. As a part of the development, more and more data is exchanged between different parties. Also data that is considered as private by one party may be exchanged. A party may be willing to provide private data when the party is sure that the private data is protected against an access of an unauthorized party. An anonymization of data may be used to transform private data and thus protect the private data to a certain level when the private data is provided to a further party.

In some cases it may be useful for a party to provide private data. A party may even be willing to reveal private data to a certain degree when there is a sufficiently good reason. As an example, an enterprise may participate in a business-to-business (B2B) scenario. The enterprise may use a platform that allows a group of suppliers to see purchase announcements of a group of manufacturers. The enterprise may be a supplier and communications of the enterprise may be logged on a server with a time stamp. The time log may be considered as private because from the time log a behavior of the enterprise with regards to purchase announcements may be observed. From the behavior a manufacturer or a competitor of the enterprise may draw conclusions to the competitive situation of the enterprise and thus obtain an advantage.

However, the enterprise may be willing to provide the time log for a joint intrusion detection. In a joint intrusion detection, data from different computer systems are used to identify an intrusion, that may have been successful or not. An important possibility to identify an intrusion is a comparison of time logs of different computer systems. The time logs may be used to find suspicious communication events that have a time coincidence. A time coincidence occurs when an intruder attempts to attack more than one computer system to find a weak point in any of the computer systems.

SUMMARY

Private data of a party may be provided to compute a distance of the private data to further data. The distance may be computed when the condition is fulfilled that the distance is less than a certain value. The private data is protected to certain security levels when the private data is used for a distance computation and when the private data are not used for a distance computation.

Accordingly, an embodiment includes a provider system. The provider system may provide the private data in such a way that the private data allow for a check of a distance condition relative to the further data and for a possible distance computation. The distance condition may be that the private data has a distance to the further data that is less than or equal to a threshold value. The check of the distance condition and the distance computation may be executed by a distance computation system that is a further embodiment. The further data may be private data of a further party and may have been provided by a further provider system that corresponds to provider system.

The provider system may transform the private data into a format that has an established level of security. Therefore, a party using the provider system may rely on the security of the format and is not required to rely on a trusted third party. Therefore, the party may have a certain security that the distance computation system may not be able to access or reconstruct the provided private data. The computations to transform the private data are standard computations and may be efficiently executed regarding computation time and computer resources such as memory. The transformed private data may be efficiently communicated because the size of the transformed data may be kept small. The efficient transformation of the private data and communication of the transformed private data allow for an automated processing of many private data. Also, the computation time and communication cost for embodiments grow linearly with the number of the private data. Furthermore, the provider system provides the private data so that the condition under which a distance computation is possible is well defined. As a result the party may be willing to provide the transformed private data so that results of the distance computations allow for a higher level of security of the party.

The distance computation system receives the transformed private data and transformed further data. The distance computation system may check the distance condition and according to the result compute the distance. The distance computation system may not be able to access the private data, even if the distance has been computed.

The check of the distance condition and the distance computation of the distance computation system involve basic computations and may be efficiently executed regarding computation time and computer resources such as memory. The processing of the received data may be efficient because the size of the received data may be kept small. Also, the computation time and communication cost for embodiments grow linearly with the number of the private data. Therefore, the distance computation system may be able to process many transformed private data leading to an increased level of security of a party providing the private data.

A further embodiment is a computer-implement method for providing the private data. The method includes transforming the private data into a format that has an established level of security. The computations of the method are standard computations and may be efficiently executed regarding computation time and computer resources such as memory. The transformed private data may be efficiently communicated because the size of the transformed data may be kept small.

A further embodiment is a computer-implement method for computing the distance between the private data and the further data. The computations of the method are basic computations and may be efficiently executed regarding computation time and computer resources such as memory. The processing of the received data may be efficient because the size of the received data may be kept small.

Further embodiments include a provider computer program product and a distance computation computer program product. The provider computer program product has features and advantages of the method for providing private data. The distance computation computer program product has features and advantages of the method for computing the distance between the private data and the further data.

DETAILED DESCRIPTION

The following description of examples includes details for illustrating embodiments and is not intended to limit the scope of the embodiments or to be exhaustive. For purposes of explanation, specific details are set forth in order to provide a thorough understanding of example embodiments. A person skilled in the art may appreciate that further embodiments may be practiced with details that differ from the specific details.

Figure 1:
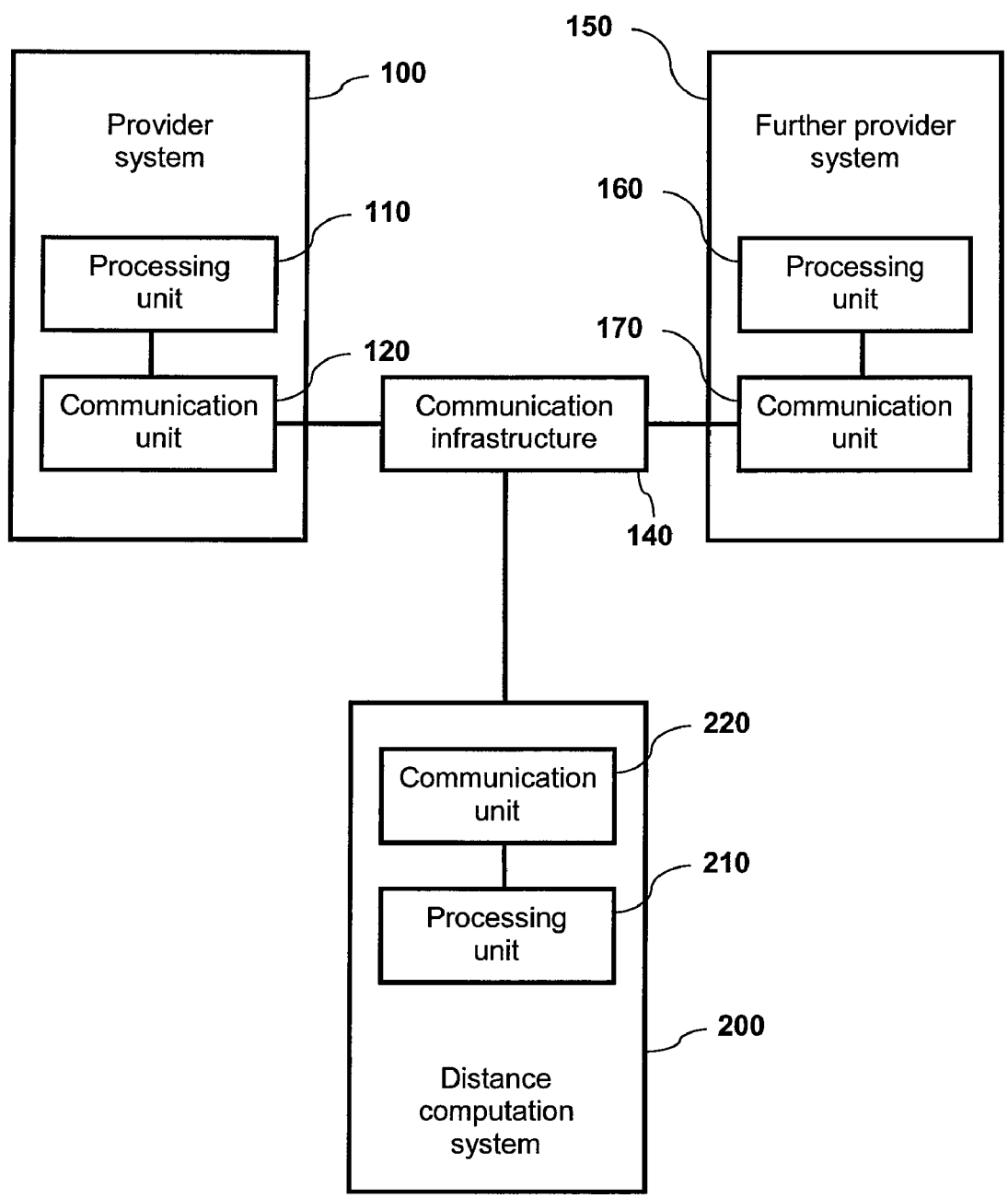
FIG. 1 is a block diagram of two systems providing data points in accordance to an example embodiment and a distance computation system in accordance to an example embodiment.

FIG. 1 is a block diagram of two systems providing data points in accordance to an example embodiment and a distance computation system 200 in accordance to an example embodiment. One of the two systems providing data points is a provider system 100 having a processing unit 110 and a communication unit 120. Another of the two systems is a further provider system 150 having a processing unit 160 and a communication unit 170. The distance computation system 200 has a processing unit 210 and a communication unit 220. The communication units 120, 170, and 220 are communicatively coupled to each other for exchanging data by a communication infrastructure 140. Furthermore, the communication unit 120 can exchange data with the processing unit 110, the communication unit 170 can exchange data with the processing unit 160, and the communication unit 220 can exchange data with the processing unit 210.

The provider system 100 may be a computer system such as a personal computer (PC), a server, a plurality of servers configured to execute software programs, or a mainframe computer system. The provider system 100 may include a client and a server related according to a client server architecture or may include one or more peer computers arranged in a peer-to-peer or distributed architecture. In a further example, the provider system 100 may include a plurality of individual computer systems that are connected by the Internet or by an intranet of an entity such as for example a company or an organization.

The provider system 100 may run, for example by hosting and executing, a program that configures the provider system 100 to have units, for example, the processing unit 110 or the communication unit 120. The units may include software units that represent encapsulated or distributed instructions that may be executed by the provider system 100 and that may provide functionality of the units. The units may also include hardware units, for example computer chips and interfaces to connect to each other and further units.

The further provider system 200 may be a computer system with a hardware that is identical to or different from the provider system 100. The distance computation system 200 may also be a computer system with a hardware that is identical to or different from the provider system 100. The provider system 100 and the further provider system 150 may be in accordance to an identical embodiment or in accordance to different embodiments. In the example, the provider system 100 and the further provider system 150 have identical structural and functional features. In a further example, the further provider system 150 may be different from any disclosed embodiments and may provide data that are not private.

The communication infrastructure 140 may include the Internet or an exclusive network with a controlled access such as an intranet of an organization or a group of computer systems.

The processing unit 110 of the provider system 100 may be configured to compute a first reference point of a data point that may represent a private data item. In an example, the data point may be a single data unit from the private data that is provided by the provider system 100. The private data may be measured data or data with a physical or tangible meaning such as time stamps or geospatial data. In an example, the data point may also be in a format that has been obtained by transforming the item of the private data by using a more compact representation or deleting parts such as specification of the year of a time stamp. Further data points representing further private data items of the private data may be transformed and provided in a corresponding way. The first reference point may have a first distance value to the data point and the first distance value may be less than a threshold value. The processing unit 110 may be configured to compute a second reference point of the data point. The second reference point may be different from the first reference point and have a second distance value to the data point and the second distance value may be less than the threshold value. The processing unit 110 may be configured to generate a hidden first reference point from the first reference point and a hidden second reference point from the second reference point.

The communication unit 120 of the provider system 100 may be configured to send the transformed private data to the distance computation system 200. The transformed private data include the hidden first reference point, the first distance value, the hidden second reference point, and the second distance value.

The communication unit 220 of the distance computation system 200 may be configured to receive the transformed private data from the provider system 100. The transformed private data may be received as a set of hidden reference points related to a data point, a first distance value, and a second distance value. The set of hidden reference points includes a hidden first reference point corresponding to the first distance value and a hidden second reference point corresponding to the second distance value. The communication unit 220 may be configured to receive further transformed private data from the further provider system 150. The further transformed private data may be received as a set of further hidden reference points related to a further data point, a further first distance value, and a further second distance value. The set of further hidden reference points includes a further hidden first reference point corresponding to the further first distance value and a further hidden second reference point corresponding to the further second distance value.

The processing unit 210 of the distance computation system 200 may be configured to compute the distance between the data point and the further data point when the distance condition is fulfilled. The distance condition is fulfilled when a hidden reference point of the set of hidden reference points is identifiable with a further hidden reference point of the set of further hidden reference points. Computation of the distance includes using a distance value to which the hidden reference point corresponds and a further distance value to which the further hidden reference point corresponds.

Figure 2:
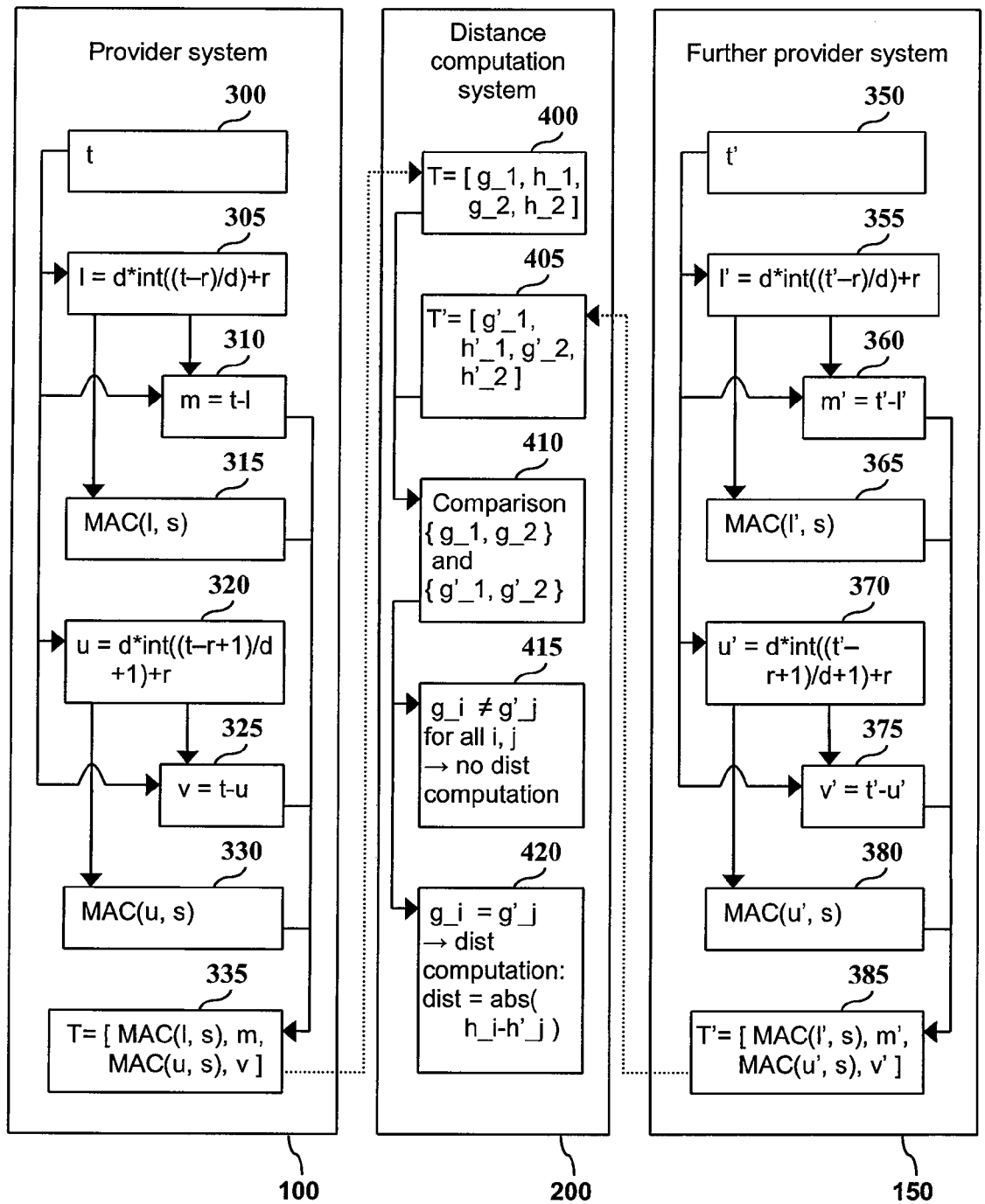
FIG. 2 is a block diagram of data items of systems that are according to example embodiments.

FIG. 2 is a block diagram of data items of systems that are according to example embodiments. In the example, the data point of the provider system 100 is a data value 300 that represents a timestamp. Similarly, a further data point of the further provider system 150 is a further data value 350 that represents a further timestamp. Arrows between data items of the diagram indicate that one data item is used as an input of the computation of the other data item.

In the example, the threshold value is represented by "d". The threshold value "d" is accessible to the provider system 100 and the further provider system 150. The threshold value "d" may be determined so that an attack of the provider system 100 and an attack of the further provider system 150 are likely within a time difference "d". The threshold "d" is used in a definition of the distance condition that is fulfilled when the data value 300 and the further data value 350 are within a distance of "d". In a further example, the data value 300 may not have been logged by the provider system 100 but by a different system that has sent the data value 300 to the provider system 100. Similarly, the further data value 350 may not have been logged by the further provider system 150 but by a different system that has sent the data value 350 to the further provider system 150. However, the threshold value "d" may be determined to be less than typical time differences between events that are logged because otherwise many timestamps from different systems may fulfill the distance condition. This may allow for reconstructing a series of timestamps of the provider system 100 or the further provider system 150 by the distance computation system 200. In a further example, the events of which timestamps are used for a joint intrusion detection may be pre-selected according to further criteria. Further criteria may be that a packet is received from a server that is not known from past communications or that is not in a list of secure servers.

In the example, the first reference point 305 is computed using the integer function and a randomization variable "r". The randomization variable "r" is a positive value and less than the threshold value "d". The randomization variable "r" may be a pseudo-random value determined according to a standard computation for pseudo-random variables. Standard computations include for example using a pseudo-random number generator such as Blum Blum Shub, ISAAC or lagged Fibonacci generators. In a further example, a simple determination of the random variable may be used but protection from such a simple determination may be lower. The randomization variable "r" is accessible to the provider system 100 and the further provider system 150 but may be inaccessible to the distance computation system 200. The randomization variable "r" may provide further protection of the data value 300 and the further data value 350 against reconstruction by the distance computation system 200.

From the first reference point 305 the first distance value 310 may be computed and the hidden first reference point 315 may be generated. In the example, the hidden first reference point 315 is computed by using a hash function "MAC" with a key "s" to hash the first reference point 305. The hash function may be any one of the following hash functions that use a key for the hashing: MD2, MD4, MD5, RIPEMD-160, SHA-1, SHA-224, SHA-256, SHA-384, SHA-512, Snefru, Tiger, Whirlpool. The hash function may be any cryptographic hash function or any message authentication code derived from a hash function. The hash function and the key may be accessible to the provider system 100 and the further provider system 150 but may be inaccessible to the distance computation system 200. The hash function may provide further protection of the data value 300 and the further data value 350 against reconstruction by the distance computation system 200 or a further unauthorized system. In a further example, a hash function without a key may be used. In a still further example, a mapping table may be used to determine hidden reference points for reference points. A mapping function may even be the unity function so that a hidden reference point is identical to the corresponding reference point.

The second reference point 320 of the data point 300 is also computed using the integer function and the randomization variable "r". The second reference point 320 is different from the first reference point 305 and has the second distance value 325 to the data value 300. In a further example, the second reference point 320 may be directly computed from the first reference point 305 by "u=I+d". The second distance value 325 is less than the threshold value "d". From the second reference point 320 the hidden second reference point 330 may be generated.

The transformed private data 335 computed from the data value 300 may then be sent to the distance computation system 200.

In the example, the further first reference point 355 of the further data value 350 is computed using the integer function and the randomization variable "r". From the further first reference point 355 the further first distance value 360 may be computed and the further hidden first reference point 365 may be generated. The further second reference point 370 of the further data value 350 is computed using the integer function and the randomization variable "r". The further second reference point 370 is different from the further first reference point 355 and has the further second distance value 375. The further second distance value 375 is less than the threshold value "d". From the further second reference point 370 the further hidden second reference point 380 may be generated.

The transformed further private data 385 computed from the further data value 350 may then be sent to the distance computation system 200.

The distance computation system 200 may receive the transformed private data 400 from the provider system 100 and the transformed further private data 405 from the further provider system 150. Received hidden reference points 410 may include a set of hidden reference points {g_1, g_2} from the transformed private data 400. The received hidden reference points 410 include also a set of hidden further reference points {g'_1, g'_2} from the transformed further private data 405. A comparison of the received hidden reference points 410 may give a negative result 415. The negative result 415 means that no hidden reference point of the set of hidden reference points is identical to a further reference point of the set of hidden further reference points. The negative result 415 means that the distance condition is not fulfilled and no distance computation is possible. More specifically, the negative result 415 means that the distance between the data value 300 and the further data value 350 is greater than threshold "d". In the example, the identity of a hidden reference point and a hidden further reference point is checked. In a further example, a hidden reference point and a hidden further reference point may be identifiable when for example also a rounding error is taken into account. A comparison of the received hidden reference points 410 may give a positive result 420. The positive result 420 may mean that at least one hidden reference point g_i is identical to at least one further reference point g'_j. The positive result 420 follows when the distance condition is fulfilled, that is, the distance between the data value 300 and the further data value 350 is less than the threshold value "d". Accordingly, the computation of the distance value "dist" between the data value 300 and the further data value 350 is possible. The distance computation may be done by computing the absolute value of the difference between the distance value h_i corresponding to the at least one hidden reference point g_i and the further distance value h'_j corresponding to the at least one hidden further reference point g'_j. In the event of the positive result 420 further joint intrusion detection processes may follow that include a cooperation with a party using the provider system 100 and a party using the further provider system 150.

In the example, the electronic data processing of the provider system 100 and the distance computation system 200 can be described as following: the data value 300 and the further data value 350 are specified with respect to grid points on the time line that have an equal spacing of "d" and that are shifted by "r". When the data value 300 and the further data value 350 have a distance less than or equal to "d" they share a common grid point and the precise distance value can be computed. When the data value 300 and the further data value 350 have a distance greater than or equal to "2*d" they do not share a common grid point and the precise distance value cannot be computed. In the range between "d" and "2*d" the distance value may or may not be computable, depending on the data value 300 and the further data value 350.

Figure 3:
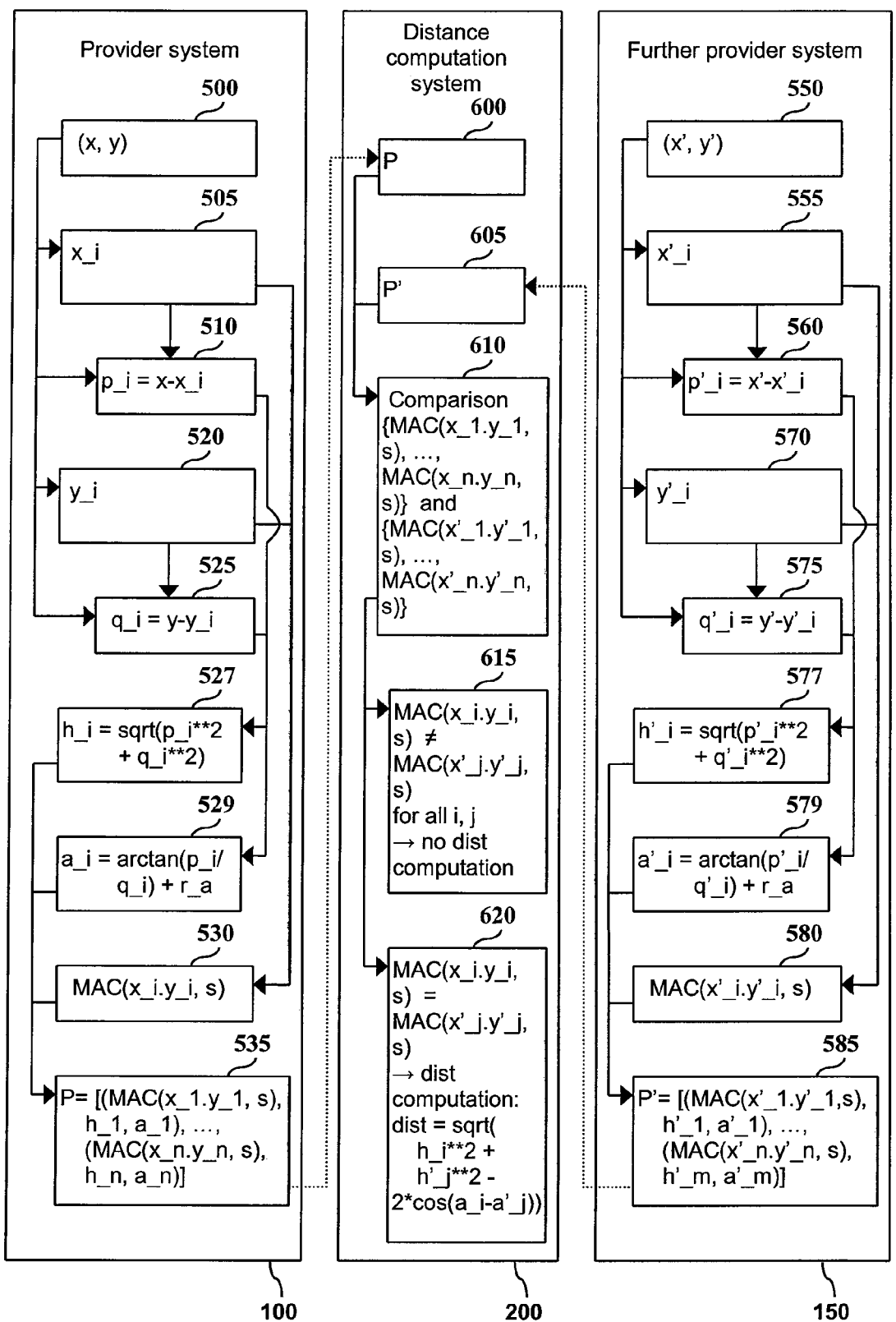
FIG. 3 is a block diagram of data items of systems that are according to further example embodiments.

FIG. 3 is a block diagram of data items of systems that are according to further example embodiments. In the example, the data point of the provider system 100 is a data point 500 that has a two-dimensional coordinate "(x, y)". Similarly, a further data point of the further provider system 150 is a further data point 550 that has a further two-dimensional coordinate "(x', y')". The example represents a two-dimensional example and accordingly the threshold value "d" represents a two-dimensional distance.

The two-dimensional example may be used for misuse detection in which geospatial proximity of two objects may indicate that a misuse is unlikely. The locations of the two objects may be recorded by different systems and each location may be considered as private data. In an example, one object may be a cell phone that can be located with a certain precision and the other object may be credit card or RFID tag that is registered at a machine with a known location. In such a case, it may be useful to verify that the two objects are within the threshold "d" to exclude misuse of an object that may have been stolen. In further examples, different scenarios may use different analytics of geospatial data which may be considered private but include a proximity evaluation.

In the two-dimensional example, the processing unit 110 may be configured to compute a set of reference points of the data point 500. Each reference point of the set has a two-dimensional coordinate and each reference point of the set is different from any other reference point of the set. The set includes the first reference point that has a two dimensional coordinate, the second reference point that has a two-dimensional coordinate, and one or more further reference points. The reference points of the set have a distance value to the data point 500 that is less than the threshold value "d". In the example, a reference point is represented by a grid point "G_i" having the coordinates "(x_i, y_i)". In an example, the grid points represent a grid that has an equal spacing of "d/sqrt(2)", "sqrt(2)" meaning the square root of "2". In a further example, the grid points may have an equal spacing of "d*(sqrt(7)−1)/2". In the example, the grid is shifted relative to the origin by the randomization variable "r" that has a two-dimensional coordinate "(r_x, r_y)". The two dimensional coordinate "(r_x, r_y)" is accessible to the provider system 100 and the further provider system 150. The two-dimensional coordinate "(r_x, r_y)" may represent a point from an origin that has a distance less than the threshold value "d" from the origin. In an example, the coordinates of the randomization variable may be determined so that "0≦r_x <d/sqrt(2)" and "0≦r_y<d/sqrt(2)". In a further example, the coordinates of the randomization variable may be determined so that "0≦r_x<d*(sqrt(7)−1)/2" and "0≦r_y<d*(sqrt(7)− 1)/2". In a further example, the coordinates of the randomization variable may be unlimited or have a much larger limit. As a person skilled in the art will appreciate there are different ways to determine the reference points, that is, the grid points that are within the distance of threshold "d" of the data point 500. As an example, a first coordinate "xp" of a potential reference point may be determined by checking that "xp∈[x− r_x−d; x−r_x+d]". A second coordinate "yp" of a potential reference point may be determined by checking that "yp∈[y− r_y−d; y−r_y+d]. " It may then be checked if the distance between the data point 500 and the potential reference point "(x_p, y_p)" is less than or equal to the threshold value "d".

In the example, there are "n" reference points that are in the set of reference points and that are represented by grid points "G_i", "i=1, . . . , n", with coordinates "(x_i, y_i)", "i=1, . . . , n". One of the reference points of the set are the first reference point and another one is the second reference point. Following data processings may be executed for all reference points of the set. The reference point "G_i" may have a first coordinate 505 "x_i" and a second coordinate 520 "y_i". A first difference value 510 "p_i" is computed from the data value 500 and the first coordinate 505 "x_i". A second difference value 525 "q_i" is computed from the data value 500 and the second coordinate 520 "y_i". A distance value 527 "h_i" of the reference point "g_i" is computed from the first difference value 510 "p_i" and the second difference value 525 "q_i". An angle value 529 "a_i" of the reference point "g_i" is computed from the first difference value 510 "p_i", the second difference value 525 "q_i", and a randomization angle "r_a". The randomization angle "r_a" may be determined so that "0≦r_a≦360". The randomization angle "r_a" is accessible to the provider system 100 and the further provider system 150 but may be inaccessible to the distance computation system 200 to improve protection of the data point 500 and the further data point 550. In the example, the angle 529 "a_i" is the angle between a line connecting the reference point "G_i" and the data point 500 and a reference direction that is the x-axis of the two-dimensional representation. A person skilled in the art will appreciate that in case that the second difference value 525 "q_i" is equal to zero, that the angle "arctan(p_i/q_i)" may be set to 90 or 270 degrees depending on "p_i".

A hidden reference point 530 may be generated from the first coordinate 505 "x_i" and the second coordinate 520 "y_i" by concatenating the strings "x_i" and "y_i" and using the hash function MAC with key "s". In a further example, a different way may be used to map the first coordinate 505 "x_i" and the second coordinate 520 "y_i" to a unique value that can be hashed. In a further example, the first coordinate 505 "x_i" and the second coordinate 520 "y_i" may be hashed separately and the hashed values may be used to identify the hidden reference point.

The communication unit 120 may be configured to send the transformed private data 535 to the distance computation system 200. The transformed private data 535 include the first distance value, the first angle value, the second distance value, the second angle value, the set of hidden reference points, and the distance value and the angle value of each further reference point of the set of "n" reference points.

The further provider system 150 has access to the further data point 550. Further reference points of a two-dimensional grid that are within a distance "d" of the further data point 550 may be determined. The number of the further reference points is "m". Each of the "m" further reference points "G'_i" has a further first coordinate 555 "x'_i" and a further second coordinate 570 "y'_i". Using the further first coordinate 555 "x'_i" a further first difference value 560 "p'_i" can be computed. Using the further second coordinate 570 "y'_i" a further second difference value 575 "q'_i" can be computed. A further distance value 577 "h'_i" of the further reference point "G'_i" is computed and a further angle value 579 "a'_i". In the example, the randomization angle "r_a" is also used to compute the further angle value 579 "a'_i". The further first coordinate 555 "x'_i" and the further second coordinate 570 "y'_i" are concatenated and hashed using the key "s" to generate the hidden further reference point 580. The further transformed private data 585 of the further provider system include the results computed for all the further reference points fulfilling the distance condition.

The system 200 has a communication unit configured to receive input data including the transformed private data 600 and the further transformed private data 605. The system 200 has a processing unit configured to compute the distance between the data point 500 and the further data point 550 when they have a common reference point. When the distance condition is fulfilled it follows that a hidden reference point of the set of hidden reference points from the transformed private data 600 is identifiable with a further hidden reference point of the set of further hidden reference points the further transformed private data 605. For this, the received hidden reference points 610 of the set of hidden reference points and of the set of further hidden reference points are compared. A negative result 615 means that no hidden reference point of the set of hidden reference points is identical to a further reference point of the set of hidden further reference points. A positive result 620 may mean that at least one hidden reference point "MAC(x_i.y_i, s)" is identical to at least one further reference point "MAC(x'_j.y'_j, s)". The positive result 620 follows when the distance condition is fulfilled. The computation of the distance may include using a distance value "h_i2" and an angle value "a_i" to which the hidden reference point "MAC(x_i.y_i,s)" corresponds. The computation of the distance may further include using a further distance value "h'_j2" and a further angle value "a'_j" to which the hidden further reference point "MAC(x'_j.y'_j, s)" corresponds.

Figure 4:
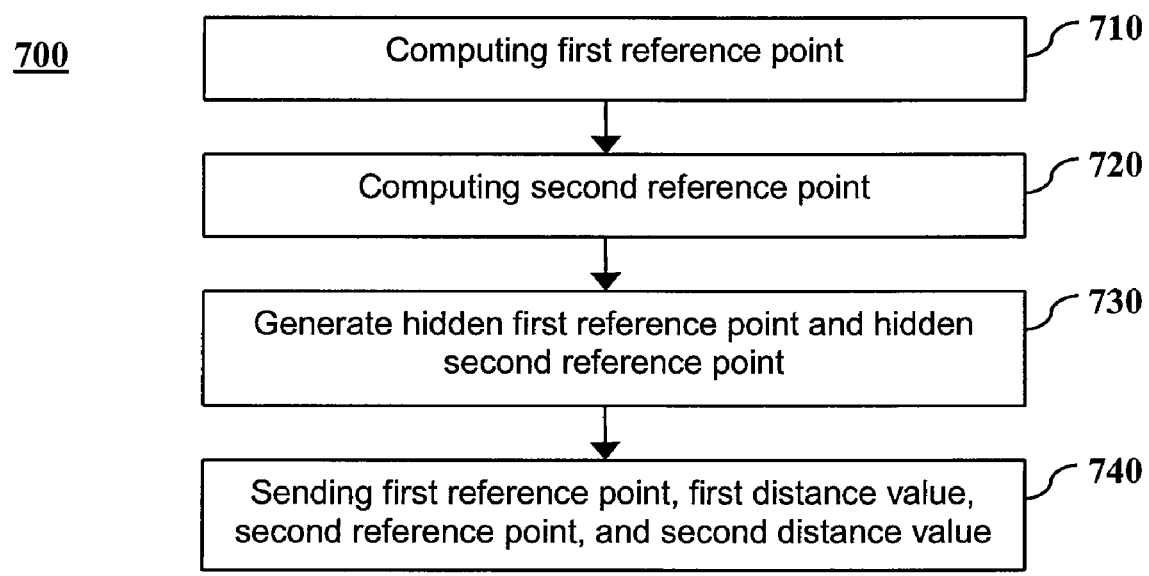
FIG. 4 is a flow diagram of operations according to an example embodiment.

FIG. 4 is a flow diagram of operations according to an example embodiment. The example embodiment is a computer-implemented method 700 for providing input of a distance computation between the data point 300 (see FIG. 2) and the further data point 350 (see FIG. 2). The data point 300 may represent a private data item and the further data point 350 may represent a further private data item. As a person skilled in the art will appreciate that following operations of the method 700 may be executed in a different order when the operations are independent.

The method 700 includes computing 710 the first reference point of the data point. The first reference point has a first distance value to the data point that is less than the threshold value.

Computing 720 a second reference point of the data point may follow. The second reference point is different from the first reference point and has a second distance value to the data point that is less than the threshold value.

Generating 730 a hidden first reference point from the first reference point and a hidden second reference point from the second reference point may follow.

The method includes sending 740 the hidden first reference point, the first distance value, the hidden second reference point, and the second distance value to a system.

In a one-dimensional example, the data point and the further data point may be timestamps. In the one-dimensional example, computing 710 the first reference point and computing 720 the second reference point may include using the randomization variable. Furthermore, generating 730 the hidden first reference point and the hidden second reference point may include using the hash function with the key to hash the first reference point and the second reference point respectively.

In a two-dimensional example, the data point and the further data point may have two-dimensional coordinates. In the two-dimensional example, computing a set of reference points of the data point may be further included. The first reference point and the second reference point have two dimensional coordinates and are part of the set of reference points. Each reference point of the set has a two-dimensional coordinate, each reference point of the set is different from the first reference point, the second reference point, and a further reference point of the set. Each reference point of the set has a distance value to the data point that is less than the threshold value. The two-dimensional example may include computing for each reference point of the set an angle value between a line connecting the reference point and the data point and the reference direction. Generating a set of hidden reference points from the set of reference points may follow together with sending the transformed private data to a system. The transformed private data may include the first angle value, the second angle value, the set of hidden reference points, and the distance value and the angle value of each reference point of the set of reference points. Computing each reference point of the set of reference points may include using the randomization variable and computing an angle value for each reference point of the set may include using the randomization angle. Generating the set of hidden reference points may include using the hash function with the key to hash two-dimensional coordinates of each reference point of the set.

Figure 5:
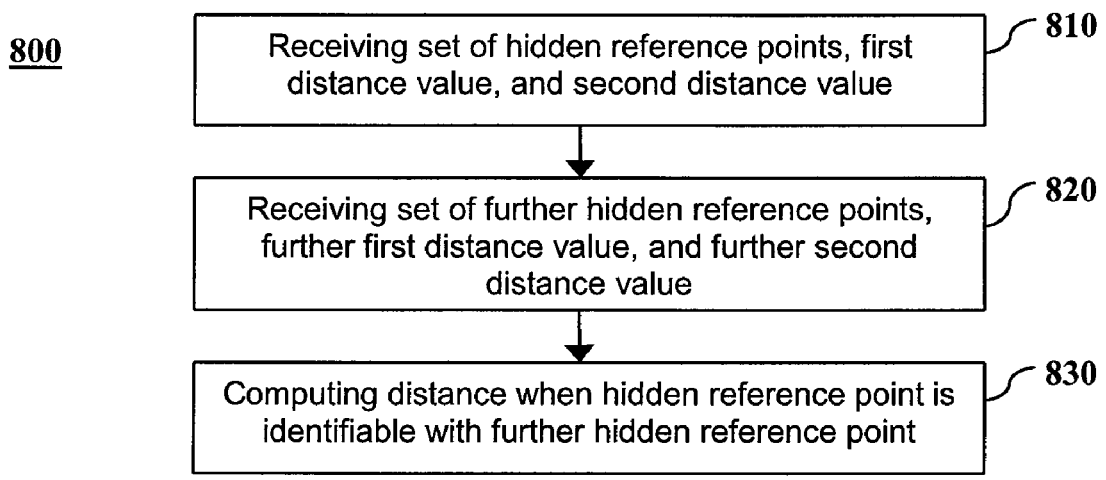
FIG. 5 is a flow diagram of operations according to a further example embodiment.

FIG. 5 is a flow diagram of operations according to a further example embodiment. The further example embodiment is a computer-implemented method 800 for computing a distance between the data point 300 (see FIG. 2) and the further data point 350 (see FIG. 2). The data point 300 may represent a private data item and the further data point 350 may represent a further private data item. As a person skilled in the art will appreciate following operations of the method 800 may be executed in a different order when the operations are independent.

The method 800 includes receiving 810 the set of hidden reference points, the first distance value, and the second distance value. The set of hidden reference points includes a hidden first reference point corresponding to the first distance value and a hidden second reference point corresponding to the second distance value.

The method 800 includes receiving 820 the set of further hidden reference points, the further first distance value, and the further second distance value. The set of further hidden reference points includes the further hidden first reference point corresponding to the further first distance value and a further hidden second reference point corresponding to the further second distance value.

Computing 830 the distance between the data point 300 and the further data point 350 may follow when a hidden reference point of the set of hidden reference points is identifiable with a further hidden reference point of the set of further hidden reference points. Computing 830 may use a distance value to which the hidden reference point corresponds and a further distance value to which the further hidden reference point corresponds.

In a two-dimensional example, the method 800 may further include receiving the set of hidden reference points, distance values, and angle values. The set of hidden reference points includes the hidden first reference point that corresponds to the first distance value and one of the angle values and the hidden second reference point that corresponds to the second distance value and one of the angle values. The set of hidden reference points further includes one or more hidden reference points each of which corresponds to one of the distance values and one of the angle values. In a two-dimensional example, the method 800 may further include receiving the set of further hidden reference points, further distance values, and further angle values. The set of further hidden reference points includes the further hidden first reference point that corresponds to the further first distance value and one of the further angle values and the further hidden second reference point that corresponds to the further second distance value and one of the further angle values. The set of further hidden reference points includes one or more further hidden reference points each of which corresponds to one of the further distance values and one of the further angle values.

Figure 6:
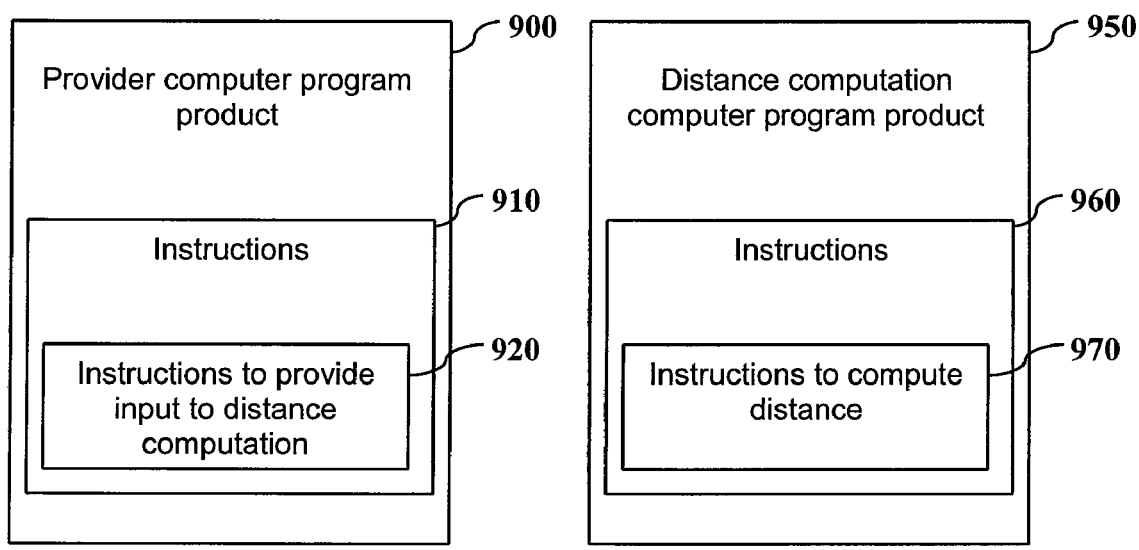
FIG. 6 is a block diagram of two computer program products that are according to example embodiments.

FIG. 6 is a block diagram of two computer program products that are according to example embodiments. One example embodiment is a computer program product 900 having instructions 910 that are executable by a computer system. The instructions 910 include instructions 920 that are configured to cause a computer system to execute operations of the method 700 (see FIG. 4). Another example embodiment is a computer program product 950 having instructions 960 that are executable by a computer system. The instructions 960 include instructions 970 that are configured to cause a computer system to execute operations of the method 800 (see FIG. 5).

As noted above, example embodiments may include computer program products. The computer program products may be stored on computer-readable media for carrying or having computer-executable instructions or data structures. Such computer-readable media may be any available media that can be accessed by a general purpose or special purpose computer. By way of example, such computer-readable media may include RAM, ROM, EPROM, EEPROM, CD-ROM or other optical disk storage, magnetic disk storage or other magnetic storage devices, or any other medium that may be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is an example of a computer-readable medium. Combinations of the above are also to be included within the scope of computer-readable media. Computer-executable instructions include, for example, instructions and data which cause a general purpose computer, a special purpose computer, or a special purpose processing device to perform a certain function or group of functions. Furthermore, computer-executable instructions include, for example, instructions that have to be processed by a computer to transform the instructions into a format that is executable by a computer. The computer-executable instructions may be in a source format that is compiled or interpreted to obtain the instructions in the executable format. When the computer-executable instructions are transformed, a first computer may for example transform the computer-executable instructions into the executable format and a second computer may execute the transformed instructions. The computer-executable instructions may be organized in a modular way so that a part of the instructions may belong to one module and a further part of the instructions may belong to a further module. However, the differences between different modules may not be obvious and instructions of different modules may be intertwined.

Example embodiments have been described in the general context of method operations, which may be implemented in one embodiment by a computer program product including computer-executable instructions, such as program code, executed by computers in networked environments. Generally, program modules include for example routines, programs, objects, components, or data structures that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such operations.

Some embodiments may be operated in a networked environment using logical connections to one or more remote computers having processors. Logical connections may include for example a local area network (LAN) and a wide area network (WAN). The examples are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An example system for implementing the overall system or portions might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, hardware implementations, or equipment for receiving manual inputs.

The invention claimed is:

1. A system comprising:
   a processing unit configured to
   compute a first reference point of a data point that represents a private data item, the first reference point having a first distance value to the data point, the first distance value being less than a threshold value,
   compute a second reference point of the data point, the second reference point being different from the first reference point and having a second distance value to the data point, the second distance value being less than the threshold value,
   generate a hidden first reference point from the first reference point and a hidden second reference point from the second reference point; and
   a communication unit configured to
   send the hidden first reference point, the first distance value, the hidden second reference point, and the second distance value to a further system.

2. The system of claim 1, wherein the processing unit is configured to compute the first reference point by using a randomization variable and to compute the second reference point by using the randomization variable, the randomization variable being less than the threshold value.

3. The system of claim 1, wherein the processing unit is configured to generate the hidden first reference point by using a hash function with a key to hash the first reference point and to generate the hidden second reference point by using the hash function with the key to hash the second reference point.

4. The system of claim 1, further comprising:
   the processing unit configured to
   compute a set of reference points of the data point that has a two-dimensional coordinate, the set of reference points comprising the first reference point and the second reference point, each reference point of the set having a two-dimensional coordinate, each reference point of the set being different from a further reference point of the set and having a distance value to the data point, the distance value being less than the threshold value,
   compute for each reference point of the set an angle value between a line connecting the reference point and the data point and a reference direction,
   generate a set of hidden reference points from the set of reference points; and the communication unit configured to
   send the set of hidden reference points and the distance value and the angle value of each reference point of the set of reference points to the system.

5. The system of claim 4, wherein the processing unit is configured to compute each reference point of the set of reference points by using a randomization variable and to compute an angle value for each reference point of the set of reference points using a randomization angle, the randomization variable having a two-dimensional coordinate and representing a point from an origin that has a distance less than the threshold value from the origin.

6. The system of claim 4, wherein the processing unit is configured to generate the set of hidden reference points by using a hash function with a key to hash two-dimensional coordinates of each reference point of the set of reference points.

7. A system comprising:
   a communication unit configured to
   receive a set of hidden reference points related to a data point that represents a private data item, a first distance value, and a second distance value, the set of hidden reference points comprising a hidden first reference point corresponding to the first distance value and a hidden second reference point corresponding to the second distance value,
   receive a set of further hidden reference points related to a further data point that represents a further private data item, a further first distance value, and a further second distance value, the set of further hidden reference points comprising a further hidden first reference point corresponding to the further first distance value and a further hidden second reference point corresponding to the further second distance value; and
   a processing unit configured to
   compute the distance between the data point and the further data point when a hidden reference point of the set of hidden reference points is identifiable with a further hidden reference point of the set of further hidden reference points by using a distance value to which the hidden reference point corresponds and a further distance value to which the further hidden reference point corresponds.

8. The system of claim 7, further comprising:
   the communication unit configured to
   receive the set of hidden reference points, distance values, and angle values, the set of hidden reference points comprising the hidden first reference point corresponding to the first distance value and one of the angle values, the hidden second reference point corresponding to the second distance value and one of the angle values, and one or more hidden reference points each one corresponding to one of the distance values and one of the angle values,
   receive the set of further hidden reference points, further distance values, and further angle values, the set of further hidden reference points comprising the further hidden first reference point corresponding to the further first distance value and one of the further angle values, a further hidden second reference point corresponding to the further second distance value and one of the further angle values, and one or more further hidden reference points each one corresponding to one of the further distance values and one of the further angle values; and
   the processing unit configured to
   compute the distance between the data point and the further data point when a hidden reference point of the set of hidden reference points is identifiable with a further hidden reference point of the set of further hidden reference points by using a distance value and an angle value to which the hidden reference point corresponds and a further distance value and a further angle value to which the further hidden reference point corresponds.

9. A computer-implemented method comprising:
   computing a first reference point of a data point, the first reference point having a first distance value to the data point, the first distance value being less than a threshold value;
   computing a second reference point of the data point, the second reference point being different from the first reference point and having a second distance value to the data point, the second distance value being less than the threshold value;

generating, using a processing unit, a hidden first reference point from the first reference point and a hidden second reference point from the second reference point; and sending the hidden first reference point, the first distance value, the hidden second reference point, and the second distance value to a system.

10. The method of claim 9, wherein computing the first reference point comprises using a randomization variable and computing the second reference point comprises using the randomization variable.

11. The method of claim 9, wherein generating the hidden first reference point comprises using a hash function with a key to hash the first reference point and generating the hidden second reference point comprises using the hash function with the key to hash the second reference point.

12. The method of claim 9, further comprising:
computing a set of reference points of the data point that has a two-dimensional coordinate, the set of reference points comprising the first reference point and the second reference point, each reference point of the set having a two-dimensional coordinate, each reference point of the set being different from a further reference point of the set and having a distance value to the data point, the distance value being less than the threshold value;

computing for each reference point of the set an angle value between a line connecting the reference point and the data point and a reference direction;

generating a set of hidden reference points from the set of reference points; and sending the set of hidden reference points and the distance value and the angle value of each reference point of the set of reference points to the system.

13. The method of claim 12, wherein computing each reference point of the set of reference points comprises using a randomization variable and wherein computing an angle value for each reference point of the set of reference points comprises using a randomization angle, the randomization variable having a two-dimensional coordinate and representing a point from an origin that has a distance less than the threshold value from the origin.

14. The method of claim 12, wherein generating the set of hidden reference points comprises using a hash function with a key to hash two-dimensional coordinates of each reference point of the set of reference points.

15. A computer-implemented method for computing a distance between a data point that represents a private data item and a further data point that represents a further private data item, the method comprising:
receiving a set of hidden reference points related to the data point, a first distance value, and a second distance value, the set of hidden reference points comprising a hidden first reference point corresponding to the first distance value and a hidden second reference point corresponding to the second distance value;

receiving a set of further hidden reference points related to the further data point, a further first distance value, and a further second distance value, the set of further hidden reference points comprising a further hidden first reference point corresponding to the further first distance value and a further hidden second reference point corresponding to the further second distance value; and computing, using a processing unit, the distance between the data point and the further data point when a hidden reference point of the set of hidden reference points is identifiable with a further hidden reference point of the set of further hidden reference points by using a distance value to which the hidden reference point corresponds and a further distance value to which the further hidden reference point corresponds.

16. The method of claim 15, further comprising:
receiving the set of hidden reference points, distance values, and angle values, the set of hidden reference points comprising the hidden first reference point corresponding to the first distance value and one of the angle values, the hidden second reference point corresponding to the second distance value and one of the angle values, and one or more reference points each one corresponding to one of the distance values and one of the angle values;

receiving the set of further hidden reference points, further distance values, and further angle values, the set of further hidden reference points comprising the further hidden first reference point corresponding to the further first distance value and one of the further angle values, a further hidden second reference point corresponding to the further second distance value and one of the further angle values, and one or more further hidden reference points each one corresponding to one of the further distance values and one of the further angle values; and computing the distance between the data point and the further data point when a hidden reference point of the set of hidden reference points is identifiable with a further hidden reference point of the set of further hidden reference points by using a distance value and an angle value to which the hidden reference point corresponds and a further distance value and a further angle value to which the further hidden reference point corresponds.

17. A computer program product comprising instructions that are configured to cause a computer system to execute operations comprising:
computing a first reference point of a data point, the first reference point having a first distance value to the data point, the first distance value being less than a threshold value;

computing a second reference point of the data point, the second reference point being different from the first reference point and having a second distance value to the data point, the second distance value being less than the threshold value;

generating a hidden first reference point from the first reference point and a hidden second reference point from the second reference point; and sending the hidden first reference point, the first distance value, the hidden second reference point, and the second distance value to a system.

18. A computer program product comprising instructions that are configured to cause a computer system to execute operations comprising:
receiving a set of hidden reference points related to a data point, a first distance value, and a second distance value, the set of hidden reference points comprising a hidden first reference point corresponding to the first distance value and a hidden second reference point corresponding to the second distance value;

receiving a set of further hidden reference points related to a further data point, a further first distance value, and a further second distance value, the set of further hidden reference points comprising a further hidden first reference point corresponding to the further first distance value and a further hidden second reference point corresponding to the further second distance value; and computing the distance between the data point and the further data point when a hidden reference point of the set of hidden reference points is identifiable with a further hidden reference point of the set of further hidden reference points by using a distance value to which the hidden reference point corresponds and a further distance value to which the further hidden reference point corresponds.

* * * * *